No. 712,719. Patented Nov. 4, 1902.
G. B. PORTER.
OPTICAL INSTRUMENT FOR TESTING THE EYES.
(Application filed Sept. 8, 1900.)
(No Model.)
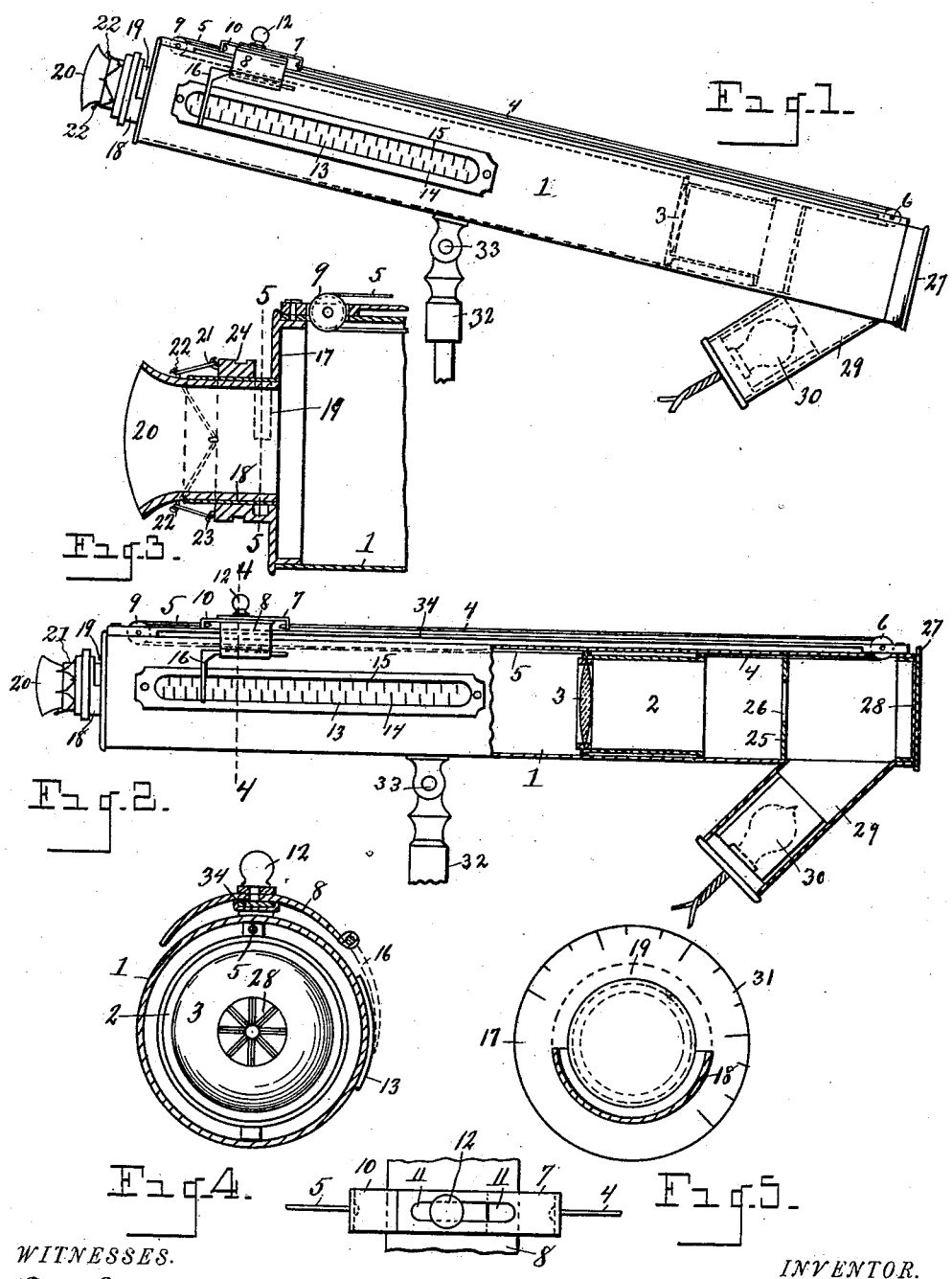
WITNESSES.
INVENTOR.
Gilbert B. Porter,
By B. W. Wheeler & Co.
Attorneys

UNITED STATES PATENT OFFICE.

GILBERT B. PORTER, OF ST. JOHNS, MICHIGAN.

OPTICAL INSTRUMENT FOR TESTING THE EYES.

SPECIFICATION forming part of Letters Patent No. 712,719, dated November 4, 1902.

Application filed September 8, 1900. Serial No. 29,473. (No model.)

*To all whom it may concern:*

Be it known that I, GILBERT B. PORTER, a citizen of the United States, residing at St. Johns, in the county of Clinton and State of Michigan, have invented certain new and useful Improvements in Optical Instruments for Testing the Eyes, of which the following is a specification.

This invention relates to optical instruments; and it consists in the construction and arrangement of parts hereinafter fully set forth, and pointed out particularly in the claims.

The object of the invention is to provide efficient means for testing the patient's eyes to determine the presence of hypermetropia, mytropia, and astigmatism, the arrangement being such as to protect the patient's eyes from the rays of light during the test, so as to obtain a more perfect result.

The above object is attained by the mechanism illustrated in the accompanying drawings, in which—

Figure 1 is an elevation of a device embodying my invention. Fig. 2 is a view, partly in section, showing the inner adjustable tube carrying the testing-lens. Fig. 3 is an enlarged sectional view through the eyepiece and rear end of the outer or focal tube. Fig. 4 is a transverse section as on line 4 4 of Fig. 2. Fig. 5 is a transverse section as on line 5 5 of Fig. 3. Fig. 6 is a plan view in detail of the adjustable slides to which are attached the ends of the cords adapted to impart a longitudinal movement to the test-lens within the main or focal tube.

Referring to the characters of reference, 1 designates the focal tube, which is of the requisite size and length and in which is mounted to slide longitudinally a short tube-section 2, carrying in its rear end the test-lens 3, which is removably seated in the tube 2 to allow a change of lenses for different tests. To provide for adjusting the test-lens tube within the focal tube, the cords 4 and 5 are attached to opposite ends of said tube, the cord 4 passing forward within the focal tube and over a pulley 6, journaled therein, thence rearwardly to the sliding plate 7, attached to a carriage 8, mounted to slide longitudinally upon the exterior of the focal tube. The cord or strand 5 passes rearwardly within the focal tube and over the pulley 9, journaled at the rear end thereof, and thence to the sliding plate 10, also mounted on the carriage 8. The plates 7 and 10 overlap, as shown, and are slotted, as at 11, to receive the screw 12, which passes through the slots in said plates and screws into the carriage 8, whereby said plates may be adjusted and firmly secured after adjustment to place and maintain the required tension upon the cords or strands 4 and 5. Mounted upon the side of the focal tube, near the end thereof, is a scale 13, having the lower graduations 14 and the upper graduations 15. Depending from the carriage 8 is a pointer 16, adapted to traverse the face of the scale 13 in conjunction with the movement of said carriage and indicate thereon the errors in the eyes of the patient being tested.

In the rear of the focal tube is a removable cap 17, having a central opening therethrough surrounded by an outwardly-projecting tube-section 18, provided with a slot 19 in its upper arc adapted to receive a lens. Fitting within the tube-section 18 is an eyepiece 20, through which the patient looks when a test is being made. Said eyepiece is adapted to slide within the tube 18 and may be drawn outwardly to allow a lens to be slipped into the slot 19 in the tube 18, the eyepiece being drawn back and held to place by the elastic strand 21, which passes over the hooks 22 onto said eyepiece and the hooks 23 on the collar 24 of the tube 18, whereby the lens when placed in the slot 19 is held therein by the elastic force of said strand 21.

Within the focal tube, near the forward end thereof, is located a disk 25, having a central sight-opening 26 therethrough. This disk divides the extreme forward end of the focal tube from the rear end thereof and because of the reduced sight-opening 26 prevents the direct rays of light from striking the eye of the patient when applied to the eyepiece 20.

In the forward end of the focal tube is a rotary cap 27, carrying upon the inner face thereof the test 28, exposed to the eye of the patient through the opening in the disk 25. Communicating with the extreme forward end of the focal tube in advance of the disk 25 is a light-tube 29, in which is seated an electric-light bulb 30, supplied by a current from any suitable source of electricity. The light-rays from the bulb 30 shine directly upon the test, so as to render it clear and sharp to the eye of the patient while the eye is relaxed because of being protected from the direct rays of light, thereby enabling the attaining of the best results. The interior of the focal tube from the disk 25 rearwardly is black to prevent a reflection of the light-rays therein, while the portion of said tube forward of the disk 25 is a dull white to effect a proper diffusion of light.

It will be observed that a movement of the carriage or slide 8 in either direction will impart a corresponding movement to the movable tube-section 2 within the focal tube carrying the testing-lens 3 and that the pointer 16 is caused to traverse the graduated scale 13 as said slide 8 is moved.

In testing for hypermetropia the slide 8 is moved forward to the limit of its movement, the patient's eye applied to the test-tube, and the light turned on. The slide is then moved slowly toward the patient until the test can be clearly seen, when the pointer 16 will register on the lower graduations on the scale the amount of manifested hypermetropia. The latent hypermetropia is discovered by placing a —8.00D lens in the slot 19 in front of the eyepiece and then moving the inner lens toward the eye of the patient until the sight is clear. The amount registered, taken from the first test, gives the full amount of latent hypermetropia. In testing for myopia the —8.00D lens is left in front of the eyepiece and the slide 8 moved to the forward end of the tube. The light is turned on and the slide moved toward the patient until the sight is clear, when the pointer will register upon the upper graduations of the scale for myopia. In testing for astigmatism the lens is removed from in front of the eyepiece and the astigmatic-wheel chart is employed upon the rotary cap 27 as the test. After the light is turned on the slide is moved toward the patient until the test can be seen distinctly, when if some of the lines of the test show lighter than others a cylindrical lens is placed in front of the eyepiece 20 and rotated until all of the lines of the test appear the same, when the graduation 31 on the outer face of the rotary removable cap 17 will register the proper cylinder to be used for correction.

The slide or carriage 8 is held in place by a suitable track 34 on the exterior of the focal tube and upon which said slide is mounted.

A standard 32, attached to a suitable base, (not shown,) is employed to mount the focal tube, which is pivoted at 33 to the upper end of said standard and allows said tube to be adjusted to any desired inclination.

Having thus fully set forth my invention, what I claim as new, and desire to secure by Letters Patent, is—

1. In a device for the purpose set forth, the combination of a focal tube, a lens-carrier within said tube adapted to move longitudinally, a lens in said carrier, a longitudinally-movable slide upon the exterior of the focal tube, rollers journaled in the opposite end of said tube, flexible strands attached to opposite ends of said carrier within said tube, said strands passing longitudinally of the tube and outward over said rollers in the opposite ends thereof, their ends being attached to the opposite sides of said slide, a scale upon the exterior of said tube and a pointer carried by said slide registering therewith.

2. In a device for the purpose set forth, the combination of a focal tube, a diametrical disk dividing said tube near its forward end and having a central aperture therethrough, a movable lens-carrier located within said tube in the rear of said disk, a lens in said carrier, a test in the forward end of said tube in front of said disk, a light positioned to throw its rays upon said test, a slide upon the exterior of the tube, means connecting said lens-carrier within the tube to said slide whereby movement is imparted to said lens-carrier as said slide is moved, an indicating-scale and a pointer carried by said slide adapted to register therewith.

3. In a device for the purpose set forth, the combination of a focal tube, a movable lens-carrying tube, a lens in said carrying-tube located within the focal tube, a slide upon the exterior of the tube, movable plates upon said slide, rollers journaled in the opposite ends of the focal tube, strands attached to the movable lens-tube and passing out of the focal tube over said rollers the ends of said strands being attached to said adjustable plates carried by said slide.

In testimony whereof I affix my signature in presence of two witnesses.

GILBERT B. PORTER.

Witnesses:
F. M. OSBORN,
G. EARL PORTER.